US007412315B2

(12) United States Patent
Wildey et al.

(10) Patent No.: US 7,412,315 B2
(45) Date of Patent: Aug. 12, 2008

(54) STEERING SYSTEM FOR ARTICULATED VEHICLES

(75) Inventors: Allan J. Wildey, Paris (CA); Steven J. England, Waterloo (CA)

(73) Assignee: Timberjack, Inc., Woodstock, Ontario (CA)

( * ) Notice: Subject to any disclaimer, the term of this patent is extended or adjusted under 35 U.S.C. 154(b) by 617 days.

(21) Appl. No.: 10/649,289

(22) Filed: Aug. 27, 2003

(65) Prior Publication Data

US 2004/0093139 A1   May 13, 2004

Related U.S. Application Data

(60) Provisional application No. 60/407,851, filed on Aug. 30, 2002.

(51) Int. Cl.
*A01B 69/00* (2006.01)
*G06F 7/70* (2006.01)

(52) U.S. Cl. ............... 701/41; 701/50; 180/418; 180/417; 180/235; 280/400

(58) Field of Classification Search .......... 701/41, 701/50, 35, 33; 280/400, 298; 180/419, 180/403, 118, 418, 417, 235
See application file for complete search history.

(56) References Cited

U.S. PATENT DOCUMENTS

| | | | |
|---|---|---|---|
| 4,081,054 A | | 3/1978 | Yates |
| 4,763,916 A | * | 8/1988 | Ratsko et al. ............... 280/432 |
| 4,771,851 A | * | 9/1988 | Nystuen et al. ............. 180/419 |
| 4,802,545 A | | 2/1989 | Nystuen et al. |
| 5,489,005 A | | 2/1996 | Marcott et al. |
| 5,781,874 A | * | 7/1998 | Troppman et al. ............ 701/50 |
| 5,908,081 A | * | 6/1999 | Olson ........................ 180/419 |
| 6,039,133 A | * | 3/2000 | Zulu ........................ 180/6.64 |

(Continued)

*Primary Examiner*—Jack W Keith
*Assistant Examiner*—Ronnie Mancho
(74) *Attorney, Agent, or Firm*—Quarles & Brady LLP

(57) ABSTRACT

A steering system for an articulated vehicle has a microprocessor connected to a proportional solenoid valve which controls the direction, amount and rate of flow of hydraulic fluid to and from hydraulic articulation cylinders, which provide articulation between the frames of the articulated vehicle. A positional feedback sensor measures the angle of articulation between the frames and communicates the angle of articulation to the processor. A gear sensor monitors the gear that the vehicle is in and communicates it to the processor. A user input device allows a user to select the desired level of steering sensitivity and also allows the user to input the size of the tires installed on the vehicle. A steering device allows the operator to provide steering input and communicates electrical steering signals to the processor based on the steering input from the operator. The processor controls the valve to provide the steering response selected by the operator, to emulate castoring so that the vehicle is returned to a straight ahead position in the center position of the steering device, to vary the stop angle based on the tire size and to gradually stop articulation at the stop angle, to gradually start and stop articulation so as to avoid hydraulic hammering. If the steering valve has a source of supply which is common to other valves of the hydraulic system, the processor can also control all of the valves to give priority to the steering valve. In addition, the interface between the steering device and the processor is the same for different types of steering devices, i.e., a steering wheel or a joystick, so that different types of steering devices may be easily provided, depending on a customer's request.

4 Claims, 2 Drawing Sheets

U.S. PATENT DOCUMENTS

| | | | |
|---|---|---|---|
| H1846 H | 4/2000 | Poorman | |
| 6,061,617 A * | 5/2000 | Berger et al. | 701/50 |
| 6,129,170 A | 10/2000 | Hickman et al. | |
| 6,170,847 B1 * | 1/2001 | Pham | 280/298 |
| 6,283,237 B1 * | 9/2001 | Muller | 180/6.48 |
| 6,422,584 B1 | 7/2002 | Bittroff et al. | |
| 6,863,144 B2 * | 3/2005 | Brandt et al. | 180/333 |

\* cited by examiner

US 7,412,315 B2

STEERING SYSTEM FOR ARTICULATED VEHICLES

CROSS-REFERENCE TO RELATED APPLICATION

This claims the benefit of U.S. Provisional Patent Application No. 60/407,851 filed Aug. 30, 2002.

FIELD OF THE INVENTION

The present invention relates to articulated vehicles. In particular, the present invention relates to the steering systems for articulated vehicles.

BACKGROUND OF THE INVENTION

Articulated vehicles, such as wheeled feller bunchers, skidders, forwarders, front end loaders and many other industrial vehicles, have a chassis consisting of two or more frames hinged together so that steering is effected by varying the angle of articulation between the frames.

The required articulation is accomplished using hydraulic cylinders that are connected to the frames. The hydraulic cylinders are typically controlled by a directional control valve which is used to supply hydraulic fluid to the cylinders to change the cylinder length, thereby varying the articulation angle between the frames. Hydraulic fluid is only supplied to change the cylinder length. Otherwise the cylinders act as a solid link, and prevent the frames from articulating to some other position. To permit the cylinder to function as a solid link, four way, three position control valves having closed-center ports are used.

However, typical articulated vehicles have various inherent problems. One problem is that they have only a single steering sensitivity level. Because regular directional control valves are used, hydraulic fluid is either supplied to the hydraulic cylinders or it is not. This only provides a single steering sensitivity for the vehicle. However, different steering sensitivity levels are required depending on the operation being performed. For example, the steering sensitivity required while harvesting (in low gear) are quite different from those required while traveling by road (in high gear).

A second problem is that typical articulated vehicles require constant steering throughout an operation. For example, if a typical articulated vehicle is turned to the right, the operator must then steer the vehicle back to the left to return to traveling in a straight path. Typical articulated vehicles will not automatically return to traveling in a straight path when the steering control is operated "hands-off", unlike typical passenger cars that will. This makes the vehicles more difficult to control and more fatiguing for an operator since they must constantly be steering the vehicle.

A third problem is that typical articulated vehicles can have different size tires installed and in some cases, when larger tires are installed, the larger tires interfere with steering by contacting each other at a certain amount of articulation. To prevent this problem, a stop must be installed to prevent articulation of the frames to a point where the tires will make contact. Since this stopping position inherently involves less than a full cylinder stroke, hydraulic cushions are not feasible. In addition, typical solid stops result in a violent action and a very abrupt stop.

A fourth problem is that typical articulated vehicles must have a separate design for each steering device desired (i.e. steering wheel v. joystick). Currently, building one version or the other involves many parts special to the selected steering system. For instance, if a steering wheel is selected, then a rotary directional control valve (either Orbitrol or Quick steer) is connected to the steering wheel and the hydraulic lines used are unique to that system. Conversely, if a joystick is selected a special directional control valve must be installed and an entirely different set of conduits is required.

It would therefore be advantageous if a steering system for an articulated vehicle could be designed that: 1) allowed for various steering sensitivity levels; 2) did not require continual steering by an operator throughout an operation; 3) had a more controlled and less violent stopping mechanism at maximum articulation; and 4) did not require a separate design for each available steering device. In particular, it would be advantageous if the steering system were designed to provide different steering sensitivity levels depending on the gear that the vehicle is in, or depending on operator selection, to provide a self centering action when no steering input is supplied, to provide a controlled, soft stopping action when the vehicle reaches maximum articulation, and to allow for a single design that would accept any desired steering device without modifying or redesigning other portions of the vehicle.

SUMMARY OF THE INVENTION

The present inventors have discovered a steering system for an articulated vehicle that provides: 1) different steering sensitivity levels based on the gear that the vehicle is in, or based on specific operator requirements and inputs; 2) the ability to provide an emulated caster effect to return the vehicle to travel in a straight path when the operator is not providing any steering input; 3) the ability to set a maximum articulation angle between the frames of the vehicle based on the size of the tires installed to avoid contact between the tires while turning; and 4) the ability to have a single design for the vehicle that will accept any manner of steering device desired.

In particular, the present invention relates to a steering system for an articulated vehicle that includes a first frame and a second frame that are pivotally connected by a pivot joint. Hydraulic cylinders are connected between the first frame and the second frame, on opposite sides of the pivot joint, for articulating the first frame and the second frame. Four way, three position proportional solenoid valves are connected to the hydraulic cylinders by hydraulic conduits to control the flow of hydraulic fluid between the hydraulic cylinders, the pressure source (e.g., a pump) and the tank pressure. A microprocessor is connected to and controls the operation of the proportional solenoids and the pump. Finally, there is a means for providing electronic steering signals to the microprocessor. By having proportional solenoids, rather than typical valves which are either opened or closed, the system can better regulate the amount and rate of flow of the hydraulic fluid to the hydraulic cylinders, thereby giving the system better and smoother steering control. In addition, rather than having a different hydraulic design for each type of steering device available, a single articulated vehicle design can be used that will accept any type of steering device desired that can send electronic steering signals to the microprocessor.

The present invention further relates to a steering system for an articulated vehicle that also includes a positional feedback sensor, connected to the microprocessor, that measures the articulation angle between the first frame and the second frame. The microprocessor also includes a means for returning the first frame and the second frame to an aligned position, based on the articulation angle, when no electronic steering signal is being received. This allows the system to provide an emulated caster effect wherein the articulated vehicle will return to traveling in a straight path in the absence of steering by an operator. This provides safer and easier control when traveling on roads and is less fatiguing when performing operations, such as harvesting.

In addition, if the steering control valve shares a source of hydraulic pressure with other control valves, and all of the valves are controlled by the same processor, the processor can control the valves to give flow priority to the steering control valve. This eliminates the need for a separate steering pump and/or hydraulic priority valve.

The present invention further relates to a steering system for an articulated vehicle that also includes an operator input device, connected to the microprocessor, that allows an operator to input the size of the tires installed on the vehicle or to otherwise change the steering sensitivity levels to his own requirements. The microprocessor also includes a way to determine a maximum articulation angle based on the size of the tires. This prevents the tires from coming into contact with each other during turns, no matter what size tire is installed on the articulated vehicle, allows a controlled stop to be set at an articulation angle ideal for the selected tires, and avoids sudden stops and violent stopping actions that typically occur with current stopping devices.

The present invention further relates to a steering system for an articulated vehicle that also includes a gear selector sensor, connected to the microprocessor, that monitors gear information. The microprocessor also includes a means for controlling the displacement and/or rate of displacement of the proportional solenoids based on the gear information. This allows the system to set to different steering sensitivity levels according to the task being performed or according to operator requirements. For example, the steering sensitivity could be set to coarse (more response for a given operator input) while performing an operation in low gear, such as harvesting, or can be set to fine (less response for a given operator input) while performing an operation in high gear, such as traveling on a road. This system allows the steering sensitivity to be varied depending on the gear or terrain variables.

DETAILED DESCRIPTION OF THE PREFERRED EMBODIMENT

Figure 1:
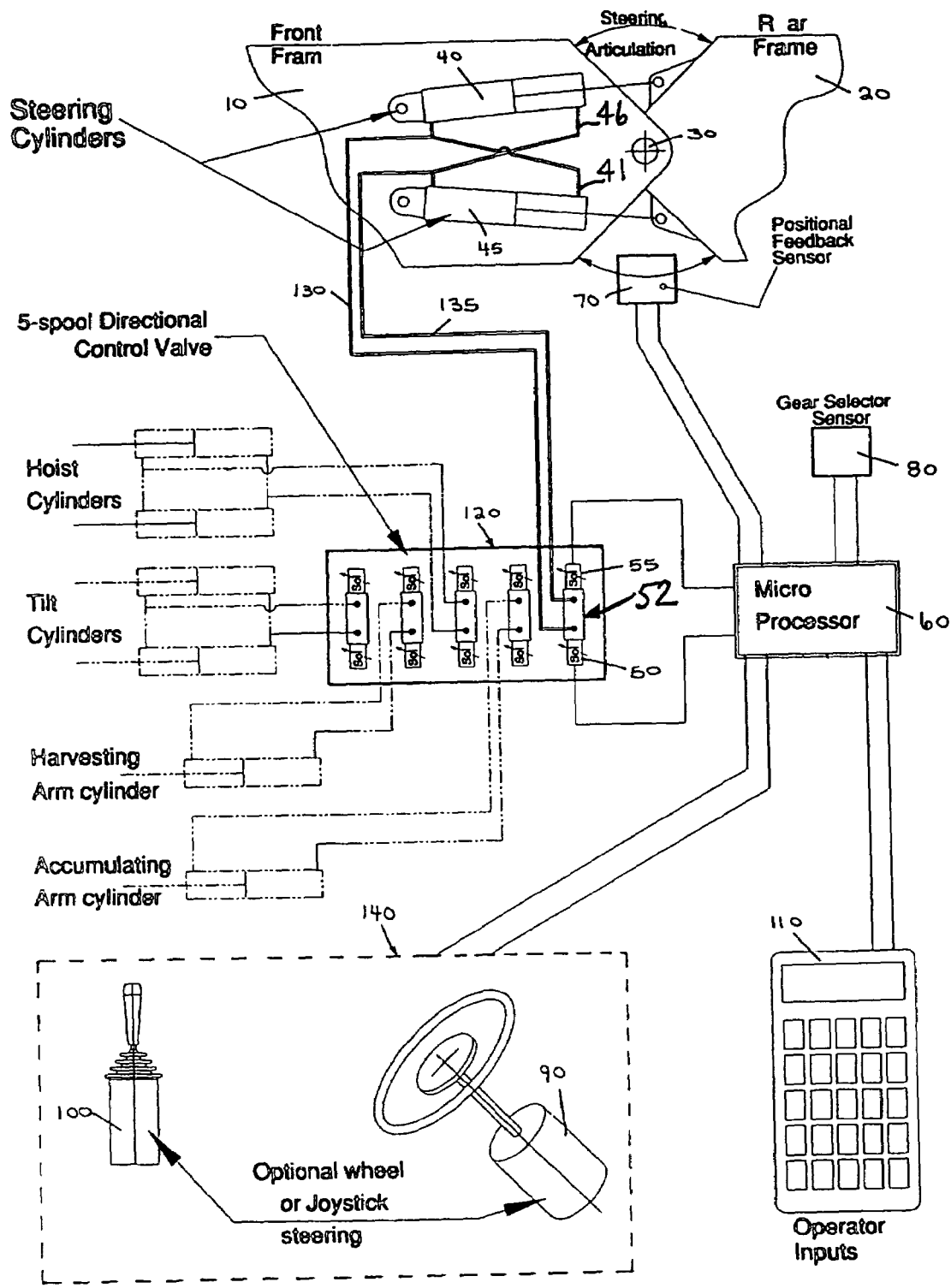
FIG. 1 is a partial schematic diagram of a steering system for articulated vehicles according to the present invention.

Referring to FIG. 1, an articulated vehicle according to the preferred embodiment of the present invention has a front frame 10 and a rear frame 20, which are pivotally connected at pivot joint 30. A pair of hydraulic cylinders 40, 45 are connected to the front frame 10 and the rear frame 20 and are located on opposite sides of the pivot joint 30 as shown. The hydraulic cylinders 40, 45 are used to steer the articulated vehicle by articulating the front frame 10 and the rear frame 20 around the pivot joint 30, thereby changing the articulation angle between the two. The front frame 10 and the rear frame 20 are articulated around the pivot joint 30 by having one of the hydraulic cylinders 40 extend while the other hydraulic cylinder 45 retracts.

Figure 2:
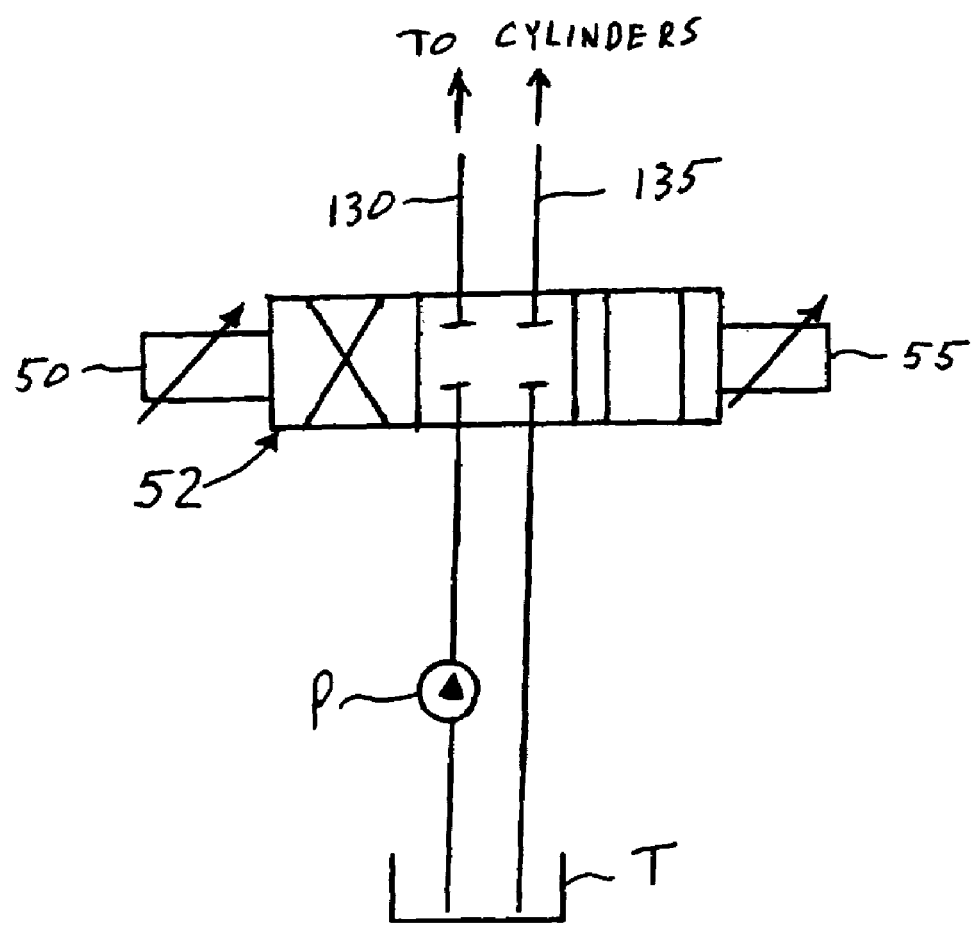
FIG. 2 is a partial hydraulic schematic view of a proportional solenoid valve for use in the system of FIG. 1.

Each of the hydraulic cylinders 40, 45 has its bore side connected to the rod side of the other cylinder 40, 45 by a conduit 41 or 46, and the conduits 41, 46 are respectively connected by hydraulic conduits 130, 135 to a four way, three position proportional solenoid valve 52 which is controlled by proportional solenoids 50, 55. Referring to FIG. 2, a source of hydraulic pressure, represented by pump P, is connected to the pressure port of the valve 52, and the reservoir tank T is connected to the tank port of the valve 52.

It should be noted that other relief or other valves could be supplied in the hydraulic circuit, which are not fundamental to practicing the present invention. For example, a pressure relief valve may be spliced into the line between the pump P and the valve 52 to relieve excess pressures in that line, even though the pump P would preferably be of the pressure compensating type. In addition, it would be common to use a port relief valve in each of the lines 130, 135 to relieve excess pressures in those lines, such as might occur when traveling in rough terrain.

When the valve 52 is shifted in one direction, for example to the left as viewed in FIG. 2 by energizing one of the solenoids 50, 55 and deenergizing the other solenoid, line 130 is connected to pump pressure and line 135 is connected to tank pressure by the valve 52. This results in extension of cylinder 40 and retraction of cylinder 45. When the valve 52 is shifted in the opposite direction by energizing solenoid 55 and deenergizing solenoid 50, line 130 is connected to tank pressure and line 135 is connected to pump pressure by the valve 52, which extends cylinder 45 and retracts cylinder 40. Since the solenoids 50 and 55 are proportional, the extent to which they provide communication between the cylinders 40, 45 and the respective pump and tank pressures will depend upon the signal which they are energized with, which may be any variable signal, such as a variable voltage, variable current or a pulse width modulated signal.

The valve 52 is part of a multi-spool control valve block 120. In addition to the proportional 4/3 valve 52 that controls the hydraulic steering cylinders 40, 45, the multi-spool directional control valve block may also contain additional valves that can control various other hydraulic equipment on the vehicle such as hoist cylinders, tilt cylinders, a harvesting arm cylinder, an accumulating arm cylinder, etc., as shown in phantom in FIG. 1. By using a microprocessor to control all of the valves supplied by the hydraulic pump for the system (pump P in FIG. 2), the microprocessor can control the valves to give flow priority to the steering valve 52. Steering is given priority over many, if not all of the other functions, meaning that if a steering input signal is received by the processor but one or more of the other valves are using up all of the available flow or pressure of the system pump, the processor can close, proportionally or totally, one or more of the other valves to divert flow to the steering valve. The processor can use the output of the positional feedback sensor 70 to monitor steering response, and when it falls short of that expected by the processor for a given output to the steering valve 52, the processor can reduce the flow through one or more of the other open valves, to divert flow to the steering valve. This eliminates the need for a separate steering pump, and/or for a hydraulic priority valve.

As mentioned above, the proportional solenoids 50, 55 control the flow rate at which hydraulic fluid is transferred between the hydraulic cylinders 40, 45 and the respective pressure source and tank, thereby controlling the rate at which the hydraulic cylinders 40, 45 extend or retract. This is done by controlling the size of the orifice through which hydraulic fluid passes through the valve 52, from the pressure source and to the tank pressure. For example, to have the hydraulic cylinders 40, 45 expand/retract more quickly for a given steering input by the operator, and therefore to have the articulated vehicle react more quickly for a given steering input, proportional solenoids 50, 55 would be energized by a signal which is greater in magnitude to move the valve spool of valve 52 to a more open position in the desired direction, allowing a faster rate of flow of hydraulic fluid to and from the hydraulic cylinders 40, 45. This would be a "coarse" setting, since for a small steering input by the operator, a relatively faster steering correction occurs, which would be desirable for slow speeds. For a slower or less sensitive motion of the hydraulic cylinders 40, 45 for a given steering input, the proportional solenoids 50, 55 would be energized by a signal which is lesser in magnitude to move the valve spool of valve 52 to a less open position in the desired direction, providing a slower rate of flow of hydraulic fluid to flow to and from the hydraulic cylinders 40, 45. This would be a "fine" setting, since a small steering input produces a relatively smaller steering correction, and would be more desirable for higher speeds of travel.

The valve 52 can also be operated to vary the magnitude of the steering angle change for a given input. The magnitude of the steering angle change is proportional to the volume of hydraulic fluid pumped through the valve 52. Once a certain volume has been pumped through the valve 52, or the valve is open at a certain setting (coarse or fine) for a certain period of time, the valve can be returned to its center closed position (shown in FIG. 2), to cut off the flow to and from the steering cylinders and hold the steering position of the front frame relative to the rear frame, as long as the steering input is not changed. Therefore, if a certain steering input corresponds to a certain open time of the valve (in one direction or the other), then the amount of steering angle change, also referred to as steering correction, will depend upon whether the steering system is in fine or coarse mode. There will be less (and slower) steering correction for a given input in the fine mode than in the coarse mode.

The proportional solenoids 50, 55 are communicatively connected to and controlled by a microprocessor 60. In response to various signals and commands, which are described in more detail below, the microprocessor 60 sends signals to the proportional solenoids 50, 55 which control which solenoid will open or close the valve 52, the amount that the solenoids will open or close the valve 52, the time that they will be open, and possibly the rate at which the solenoids will open or close the valve.

A positional feedback sensor 70, a gear selector sensor 80, a steering device 140, and an operator input device 110 are also communicatively connected to the microprocessor 60.

The positional feedback sensor 70 is connected to the front frame 10 and the rear frame 20 of the articulated vehicle and is used to measure the articulation angle between the front frame 10 and the rear frame 20. The output signal of the sensor 70 is communicated to the microprocessor 60 as an input of the steering angle of the machine. It will be understood by those skilled in the art that the positional feedback sensor 70 does not have to be connected to the front frame 10 and the rear frame 20 but could also be connected to the pivot joint 30 to measure the angular displacement between the front frame 10 and rear frame 20 or could be any other means for measuring the angle between the front frame 10 and the rear frame 20.

The gear selector sensor 80 is connected to the transmission of the articulated vehicle (not shown) and is used to determine the gear that the transmission is in. The output signal of the sensor 80 is communicated to the microprocessor 60 to provide an input of which gear the machine is in.

The steering control device 140 is used to receive mechanical steering inputs from the operator, to convert the mechanical steering inputs into corresponding electrical steering signals, and to communicate the electrical steering signals to the microprocessor 60. In the preferred embodiment of the invention, the steering device 140 is an electric steering wheel 90 or an electric joystick 100. However, it will be understood by those skilled in the art that any type of steering device that can accept a mechanical steering input from an operator and convert the mechanical steering input into a corresponding electrical steering signal can be used.

The operator input device 110 is used to receive information from the operator and to communicate this information to the microprocessor 60 as an electrical signal. As described in more detail below, in the preferred embodiment of the invention the operator input device 110 may include a steering sensitivity selection switch and a tire size input device.

The steering sensitivity selection switch allows the operator to manually select between coarse mode, fine mode, or automatic mode. As described in more detail below, the operator would select between coarse, fine, and automatic modes depending on the steering sensitivity desired.

The tire size input device allows the operator to input the size of the tires installed on the articulated vehicle. The tire size input by the operator is then communicated to the microprocessor 60 and is used to determine a maximum allowable articulation angle between the front frame 10 and the rear frame 20, which the microprocessor will then not exceed, based on the measured articulation angle from the sensor 70. The tire size may be input by any suitable method, such as direct input, a pull down menu or similar input interface, following which the processor 60 may compare the input to a look-up chart to determine the maximum allowable angle of articulation.

Prior to operating the articulated vehicle after a tire change, the operator would use the tire size input device of the operator input device 110 to input the size of the tires installed on the articulated vehicle. To prevent the tires from making contact during a turn, the operator input device 110 would communicate the tire size input by the operator to the microprocessor 60, which would determine the maximum allowable articulation angle between the front frame 10 and the rear frame 20 to keep the tires from contacting each other. The microprocessor 60 would then set a stop position at the maximum allowable articulation angle wherein the microprocessor 60 will not allow continued articulation of the frames beyond the stop position. Also, the proportional control valve 52 controlled by the microprocessor 60 permits a controlled stop and start, i.e., a gradual stop and start by gradually opening and closing the valve avoiding suddenness caused in prior designs by hitting mechanical stops or by using an on-off valve, so the steering action can be smooth irrespective of the extent to which the frames are being articulated.

The operator would also use the steering sensitivity switch of the operator input device 110 to select the desired steering sensitivity. This can be done prior to the actual operation of the vehicle or can be done at any time during the operation of the vehicle, although perhaps not in a certain high gear. In high gear, it may be desirable to make the only option fine steering sensitivity, to avoid unexpectedly sensitive steering response. If the operator knows that coarse steering sensitivity (more steering response for a given steering input, either in terms of speed or magnitude of response, or both) will be required, such as when the vehicle will be operated in low gear, the operator can select coarse mode which will remain in effect as long as it is selected (except perhaps in high gear as stated above). If the operator knows that fine steering sensitivity (less steering response—in speed, magnitude or both—for a given steering input) will be required, such as when traveling at higher speeds, the operator can select fine mode which will remain in effect for as long as it is selected. If the operator knows that there will be a need for changing between coarse and fine steering sensitivity depending upon the conditions which are input to the microprocessor, or is not sure which mode will be best for a given task, the operator can select automatic mode, which will then change between coarse and fine, depending upon the gear the vehicle is in or perhaps the speed with which the operator is operating the steering input device, or the range through which the operator is operating the input device.

If coarse mode is selected, the microprocessor 60 sends signals to the proportional solenoids 50, 55 to fully open, or at least open more fully and/or for longer duration, than in the fine mode, in response to the electrical steering signals received from the steering device 140. This allows for faster, and for a given open time possibly larger, changes in the angle between the front frame 10 and the rear frame 20 in response to any given steering input. In fine mode, the microprocessor 60 would send signals to the proportional solenoids 50, 55 to open a lesser amount, or to open at a lower rate and/or for a shorter duration, in response to the given steering input received from the steering device 140. This allows for more controlled changes in the angle between the front frame 10 and the rear frame 20 in response to the steering inputs. In automatic mode, the microprocessor 60 would use the input from the gear selector sensor 80 to determine the appropriate steering sensitivity for the particular gear. The description of the operation of the preferred embodiment of the invention below assumes that the steering sensitivity switch has been set to automatic mode.

Once the tire size has been input and the steering sensitivity, e.g., automatic, has been selected, the articulated vehicle is ready for operation. In the preferred embodiment of the invention, during operation, the positional feedback sensor 70 is continually measuring the articulation angle between the front frame 10 and the rear frame 20 and communicating this information to the microprocessor 60. For example, the articulation angle could be measured as the angle formed between the longitudinal axes of the front frame 10 and the rear frame 20. Therefore, when the articulated vehicle is traveling in a straight path, and the front frame 10 and rear frame 20 are aligned along their longitudinal axes, the articulation angle would be, for example, 0° or zero articulation. Alternatively, the positional feedback sensor 70 could be set up to continually measure the articulation angle and only communicate with the microprocessor 60 when there is a change (+ or −) in the articulation angle. By knowing the initial articulation angle between the front frame 10 and the rear frame 20, the microprocessor 60 could then determine the articulation angle at any given time from the changes in articulation angle received from the positional feedback sensor 70.

Similarly, the gear selector sensor 80 continually monitors the gear that the vehicle is in and communicates this information to the microprocessor 60. Alternatively, the gear selector sensor 80 could be set up to continually monitor the gear that the transmission is in and only communicate with the microprocessor 60 when the gear is changed. By knowing the gear that the vehicle starts in, the microprocessor 60 could then determine the gear at any given time from the changes in gear received from the gear selector sensor 80. Therefore, at any given point in time, the microprocessor 60 will have information as to the current articulation angle between the front frame 10 and the rear frame 20 and the gear that the vehicle is in.

To turn the articulated vehicle, the operator uses the steering device 140. For example, if the steering device 140 is a steering wheel 90, as described above, the operator would turn the steering wheel 90 in the direction of the desired turn. Similarly, if the steering device 140 is a joystick 100, as described above, the operator would move the joystick 100 in the direction of the turn. The steering device 140 then converts the steering input from the operator into an electrical steering signal indicative of the direction and magnitude of the steering input and communicates the electrical steering signal to the microprocessor 60.

When the microprocessor 60 receives the electrical steering signal from the steering device 140, it compares the current articulation angle between the front frame 10 and the rear frame 20, received from the positional feedback sensor 70, with the stop positions (one left and one right), which were determined based on the tire size input by the operator. If the articulation angle between the front frame 10 and the rear frame 20 is already at the stop position in the direction of the desired turn, the microprocessor 60 will not take any action based on the electrical steering signal received. For example, if the stop position between the front frame 10 and the rear frame 20 is determined to be 20° (+ or −) based on the tire size entered by the operator and the positional feedback sensor 70 communicates that the articulation angle between the front frame 10 and the rear frame 20 is currently at −20° (the left stop position), if the microprocessor 60 is receiving an electrical steering signal to turn further to the left, the microprocessor will take no action in response to the electrical steering signal. If the articulation angle between the front frame 10 and the rear frame 20 has not yet reached the stop position, the microprocessor will determine the gear that the vehicle is in based on the information received from the gear selector sensor 80.

If the vehicle is in low gear at the time the electrical steering signal is received, the microprocessor 60 will send a coarse magnitude signal to the proportional solenoids 50, 55 to open more fully and/or for a longer duration in the correct direction than they would open with a fine magnitude signal for the same steering input. This would result in a steering response which was faster and/or of a greater change in steering angle than in the fine mode. For example, if the microprocessor 60 receives an electrical steering signal to turn to the left (to turn the front frame 10 counterclockwise in FIG. 1), and the articulation angle between the front frame 10 and the rear frame 20 has not reached the leftward stop position, the microprocessor 60 will send a signal to the proportional solenoids 50, 55 to open to a greater orifice size to result in a higher flow rate for a given time, or to open for a longer period to transfer more hydraulic fluid from the pressure source to line 130 and more fluid from line 135 to the tank, than in the fine mode. Once this amount of fluid, which is directly proportional to a given change in articulation angle, has been reached, as long as the steering input remains the same, the valve 52 is returned to its closed center position so that steering changes stop (the angle of articulation stops changing). As mentioned above, the initial opening and final closing of the valve 52 are preferably done slowly, so as not to produce any hydraulic hammer or suddenness in response.

If the vehicle is in high gear at the time the electrical steering signal is received, the microprocessor 60 will send a signal to the proportional solenoids 50, 55 to open a predetermined portion, less than the amount they'd open in the "coarse" setting, and/or for a shorter duration, to transfer hydraulic fluid between the hydraulic cylinders 40, 45 and the respective pressure source and the tank. By opening the proportional solenoids 50, 55 less than their full amount the transfer of hydraulic fluid between the hydraulic cylinders 40, 45 is slower and a smoother, more controlled turn is achieved. By opening for the same duration as in coarse mode if the flow rate is lower, or by opening for a shorter duration if the flow rate is the same, a smaller amount of hydraulic fluid is transferred to and from the steering cylinders, resulting in a smaller displacement of them, and a lower magnitude of change in the steering angle. Either way, the steering response is less, either in terms of speed of response, magnitude of response, or both.

Upon receipt of a signal from the microprocessor 60, one or the other of the proportional solenoids 50, 55 will be actuated according to the signal provided to them. Preferably, this signal starts out gradually, to gradually open the valve 52, develops to either the coarse or fine rate (whichever is applicable) for the steering input, stays open for the applicable time for the coarse or fine setting for the steering input, and then closes at the applicable coarse or fine rate, and in any event, complete closing is accomplished at a rate that eliminates suddenness. With the valve 52 in its closed center position, the hydraulic cylinders 40, 45 cannot move to change the articulation angle between the front frame 10 and the rear frame 20, so they act as a solid link to prevent the front frame 10 and the rear frame 20 from moving to some other position.

As stated above, when the articulation angle between the front frame 10 and the rear frame 20 reaches the stop position, which is determined based on the tire size input by the operator, the microprocessor 60 sends a signal to the proportional solenoids 50, 55 to close the valve 52, thereby stopping the articulation of the front frame 10 and the rear frame 20. Alternatively, as the articulation angle between the front frame 10 and the rear frame 20 approaches the stop position, the microprocessor 60 could send a signal to the proportional solenoids 50, 55 to start closing at a predetermined rate so that the proportional solenoids 50, 55 would be fully closed when the articulation angle reaches the stop position. This provides a smoother and more controlled stop as the articulation angle between the front frame 10 and rear frame 20 approaches the stop position.

In addition, in the preferred embodiment of the invention, the steering system has the ability to provide an emulated caster effect wherein the articulated vehicle will return to traveling in a straight path when the steering device 140 is operated "handsoff". For example, if an operator were to move the joystick 100 or steering wheel 90 to the right, the front frame 10 would rotate clockwise, through the process described above, thereby turning the articulated vehicle to the right. When the operator releases the joystick 100 or steering wheel 90, it returns to its center position and the electrical steering signals being sent from the joystick 100 to the microprocessor 60 would cease, or return to the signal which is output from the device in the center position. In response to that signal or lack of signal, the microprocessor 60 would check the articulation angle between the front frame 10 and the rear frame 20, via the information received from the positional feedback sensor 70, to determine if the articulation angle shows that the longitudinal axes of the front frame 10 and the rear frame 20 are aligned (i.e. the articulated vehicle is traveling in a straight path). If the longitudinal axes of the front frame 10 and the rear frame 20 are not aligned, the microprocessor 60 will send signals to the proportional solenoids 50, 55 to control the valve 52 so as to transfer hydraulic fluid between the hydraulic cylinders 40, 45, the pressure source P and the tank T, to align the longitudinal axes of the front frame 10 and the rear frame 20. This emulated caster effect provides safer and easier control of the articulated vehicle when traveling in high gear (at high speeds), for example when traveling on roads, and is also less fatiguing to the operator when traveling in low gear (at low speeds), for example when harvesting.

Furthermore, by using a steering device 140 that provides electrical steering signals, rather than typical mechanical/hydraulic steering devices, an articulated vehicle can be manufactured with a generic interface for the steering device 140 rather than having to manufacture different hydraulic conduits and controls, depending on the steering device 140 employed. This allows manufacturers to design and manufacture a single type of hydraulic control system interface, while still allowing operators to choose between different types of steering devices.

While the foregoing specification illustrates and describes the preferred embodiments of this invention, it is to be understood that the invention is not limited to the precise construction or operation herein disclosed. The invention can be embodied in other specific forms without departing from the spirit or essential attributes of the invention. Accordingly, reference should be made to the following claims, rather than to the foregoing specification, as indicating the scope of the invention.

We claim:

1. A steering system for an articulated vehicle, comprising:
   a) a first frame;
   b) a second frame pivotally connected to the first frame by a pivot joint;
   c) at least one hydraulic cylinder, connected between the first frame and the second frame and spanning the pivot joint, to articulate the first frame and the second frame relative to one another;
   d) a proportional solenoid actuated hydraulic valve in communication with the hydraulic cylinders to control the flow of hydraulic fluid to the hydraulic cylinder;
   e) an operator controlled steering input device;
   f) a processor communicatively connected to the proportional solenoid valve and to the steering input device to control the valve in response to inputs from the steering input device; and
   g) a sensitivity selector including a gear selector sensor configured to determine a desired steering sensitivity setting, which is a desired steering response to a given operator input to the steering input device, the sensitivity selector being communicatively connected to the processor to provide an input signal to the processor that causes the processor to vary the signal output to the valve in accordance with the input signal from the sensitivity selector, wherein the setting of the sensitivity selector is determined by what gear the vehicle is in.

2. A steering system for an articulated vehicle, comprising:
   a) a first frame;
   b) a second frame pivotally connected to the first frame by a pivot joint;
   c) at least one hydraulic cylinder, connected between the first frame and the second frame and spanning the pivot joint, to articulate the first frame and the second frame relative to one another;
   d) a proportional solenoid actuated hydraulic valve in communication with the hydraulic cylinders to control the flow of hydraulic fluid to the hydraulic cylinder;
   e) an operator controlled steering input device;
   f) a processor communicatively connected to the proportional solenoid valve and to the steering input device to control the valve in response to inputs from the steering input device; and
   g) a sensitivity selector configured to determine a desired steering sensitivity setting, which is a desired steering response to a given operator input to the steering input device, the sensitivity selector being communicatively connected to the processor to provide an input signal to the processor that causes the processor to vary the signal output to the valve in accordance therewith, wherein the setting of the sensitivity selector is determined directly by an operator, further comprising an operator input device communicatively connected to the processor and configured to allow an operator to input a tire size, wherein the processor determines an allowable articulation angle between the first frame and the second frame based on the tire size input by the operator, and wherein the processor controls the valve to prevent articulation of the first frame and the second frame past the allowable articulation angle.

3. A steering system for an articulated vehicle as recited in claim 2, wherein the processor controls the valve to slow down articulation as the allowable articulation angle is approached.

4. A steering system for an articulated vehicle, comprising:
a) a first frame;
b) a second frame pivotally connected to the first frame by a pivot joint;
c) at least one hydraulic cylinder, connected between the first frame and the second frame and spanning the pivot joint, to articulate the first frame and the second frame relative to one another;
d) a proportional solenoid valve in communication with the hydraulic cylinders to control the flow of hydraulic fluid to the hydraulic cylinder;
e) an operator controlled steering input device;
f) an input device configured to allow an operator to input tire size;
g) a processor communicatively connected to the proportional solenoid valve and to the steering input device to control the valve in response to inputs from the steering input device;
h) wherein the processor controls the valve so as not to exceed an allowable articulation angle between the first and second frames which the processor sets based on the tire size input by the operator.

* * * * *